June 10, 1930.  G. H. STEVENSON  1,763,015
OPERATION OF ELECTRIC SPACE DISCHARGE DEVICES
Filed Sept. 7, 1926

Inventor:
George H. Stevenson,
by  E. W. Griggs
Attorney

Patented June 10, 1930

1,763,015

UNITED STATES PATENT OFFICE

GEORGE H. STEVENSON, OF SOUND BEACH, CONNECTICUT, ASSIGNOR TO BELL TELEPHONE LABORATORIES, INCORPORATED, OF NEW YORK, N. Y., A CORPORATION OF NEW YORK

OPERATION OF ELECTRIC SPACE-DISCHARGE DEVICES

Application filed September 7, 1926. Serial No. 133,898.

This invention relates to the operation of electric space discharge devices, as for example, in amplifying electric variations or modulating electric waves.

An important object of the invention is to obtain large energy output from electric space discharge devices.

Another object is to stabilize operation of electric space discharge devices, as for example, to prevent undesired regeneration or feed-back in circuits including such devices.

In the operation of these devices it has heretofore been considered that, in order to obtain the maximum possible energy output, the resistance of the space discharge path should approximately equal the absolute value of the external impedance of the output circuit.

Applicant has discovered that the apparent value of the resistance of the space discharge path depends, in a manner pointed out specifically hereinafter, upon the amplification factor of the tube and upon the magnitude and phase of the feed-back and that the condition for maximum energy output from the tube is that, in absolute magnitude, the total impedance faced by the space discharge path match this apparent value.

It is an important consequence, since the admittance of the output circuit, or external plate-filament circuit, ordinarily is the most important part of the total facing the space discharge path, that the condition for maximum energy output from the tube is that the impedance of the output circuit approximately equal the apparent value of resistance mentioned above. A feature of the invention relates to such matching of impedances in the circuit of an electric space discharge device.

In the applicant's copending application, Serial No. 691,556, filed February 9, 1924, there is disclosed an amplifier in which waves to be amplified are applied between the grid and a point in the output circuit at a potential equal to that of the grid, so that no current from the space discharge path flows through the wave source. In accordance with one specific aspect of the instant invention, such an amplifier has the impedance of its output circuit adjusted to approximately equal, in absolute value, the above mentioned apparent value of impedance of the space discharge path. Since in such an amplifier, the impedance through which current from the space discharge path flows between the grid and the filament is not dependent upon the impedance of the source of waves to be amplified, the feed-back effect may be made constant for all frequencies, in which case the above mentioned apparent value of the resistance of the space discharge path will be constant for all frequencies. The constancy of this apparent value of resistance facilitates maintenance of the condition for maximum energy output from the amplifier, over a considerable range of frequencies.

In accordance with the disclosure in the above mentioned copending application, the above mentioned point in the amplifier output circuit at which the potential equals that of the grid may be the junction point of two condensers which are connected in series between the plate and the filament of the amplifier, in parallel with a load circuit. The condensers form two arms of a Wheatstone bridge, the other two arms of which are the grid-plate capacity and the grid-filament capacity. The load circuit and the source of the waves to be amplified form conjugated branches of the bridge. In a specific aspect, a feature of the instant invention relates to making the condensers and the load circuit cooperate to form a circuit selective to waves of desired frequencies. For example, a frequency selective circuit so formed may be a fixed, broad band filter, and the amplifier may be one of a series of amplifiers coupled together through similar broad band filters, the filters having impedances, in their pass bands, approximately equal to the above mentioned apparent value of the resistance of the space discharge path. Although the condensers may be of fairly large capacity to obtain the desired impedance of the filter, they have no objectionable tendency to shunt energy away from the load, since they form part of the frequency selective circuit.

Another feature of the invention relates to connecting a grid leak path around one of the condensers mentioned above, whereby unbalancing the Wheatstone bridge and unduly reducing the potential applied to the grid by the waves to be amplified, are avoided.

Another feature relates to an auxiliary balancing condenser of a special form, whereby the bridge balance may be readjusted at any time without affecting the input impedance of the amplifier.

A copending application of Eugene Peterson, Serial No. 969,766, filed March 4, 1924, discloses an electric space discharge detector in which demodulation is accomplished in the input circuit of a space discharge tube due to changes which the waves in that circuit produce in the relative values of impedance elements of that circuit. The waves render the grid potential positive at times, and lower the grid filament impedance, so that current flows between the grid and the filament, the voltage drop in the external impedance between the grid and the filament preventing the grid potential from rising proportionally to the electromotive force waves applied to the input circuit. Due to this non-linear relationship, detection occurs in the input circuit. This type of detector may be termed a grid current detector. By including an anti-resonant loop in the plate circuit of a grid current detector, to suppress the high frequency currents in the plate circuit, the output energy level at which the detector may be operated can be increased. However, the presence of the anti-resonant loop tends to cause the tube to regenerate. In accordance with a specific aspect of one feature of the instant invention a grid current detector is arranged with condensers balancing interelectrode capacities of the detector tube, those capacities and also those condensers forming arms of a Wheatstone bridge for rendering the input and output circuits of the tube conjugate to each other, in the general manner referred to above in connection with an amplifier; and the condensers cooperate with reactance in the output circuit, to form a high impedance circuit, as for example, an anti-resonant circuit, for the high frequency waves in the plate circuit, thereby increasing the energy level of the detector output. Since the output and input circuits of the detector are conjugate, the anti-resonant loop or high impedance path in the output circuit is prevented from causing objectionable regeneration.

Other objects and features of the invention will be apparent from the following description and claims.

Figure 1:
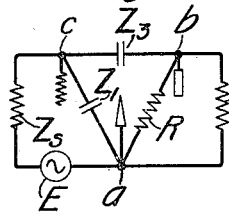
Fig. 1 represents an ordinary vacuum tube amplifier circuit in a manner suitable for facilitating explanation of the invention.

In Fig. 1, $a$, $b$ and $c$ denote respectively the filament, plate and grid terminals of a vacuum tube in an ordinary circuit. $Z_1$ and $Z_3$ denote respectively the internal grid-filament and grid-plate impedances, which are substantially purely capacitive. R denotes the internal plate filament resistance of the tube. E is the electro-motive force applying waves to the input circuit of the tube. $Z_s$ is the impedance of the source E. $Z_r$ is the impedance of the load circuit.

In general, in an electric space discharge amplifier circuit, as for example the amplifier circuit represented in Fig. 1, there are two components of alternating space current. One of these components is the transmitted component, which is the component of space current which would flow if $\mu$, the amplification constant of the tube, were zero and the impedances of the tube were unchanged. The remainder of the space current is the other of the two components, or the amplified component. The transmitted component is generally negligibly small. In balanced circuits, such as the Wheatstone bridge amplifier circuit represented in Fig. 3 described below, it is zero.

The value of the amplified component, which will be designated I, will now be considered. Considering the passive condition of the network, that is, the condition is which it would be were $\mu$ equal to zero, the transmitted waves corresponding to an E. M. F., E in the input circuit establish an E. M. F., say $E_g$, between the grid and the filament. It can be shown that the amplified component I in the space discharge path may be expressed in terms of this voltage $E_g$ and, so expressed, is $$I = \frac{\mu E_g}{R + Z_T \times q} = \frac{\frac{\mu E_g}{q}}{\frac{R + Z_T}{q}} \quad (1)$$

in which $\mu$ is the amplification constant of the amplifier tube, R is the internal plate-filament resistance of the tube, $Z_T$ is the total impedance which R faces, and is given by $Z_T = \frac{Z_r(W_s + Z_3)}{Z_r(W_s + Z_3)}$, where, as indicated in Fig. 1, $Z_r$ equals the external plate-filament impedance, $Z_3$ equals the impedance of the plate-grid capacity, $W_s = \frac{Z_1 Z_s}{Z_1 + Z_s}$, the total impedance between the grid and the cathode and $$q = 1 + \mu \frac{W_s}{W_s + Z_3} \quad (2)$$

The term $q$ which has been called the regeneration factor measures the degree of feed-back and the amount of regenerative action.

Figure 2:
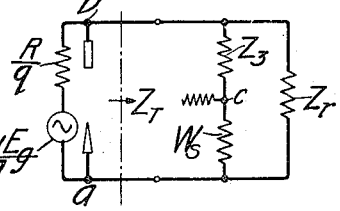
Fig. 2 shows an equivalent circuit useful in explaining the invention.

From (1), the equivalent circuit of the amplifier can be seen to be as shown in Fig. 2, $Z_T$ being there shown in accordance with the above expression for $Z_T$ specific to the case of the amplifier circuit of Fig. 1. In Fig. 2, $R/q$ is the apparent resistance of the space discharge path, and $\frac{\mu E_g}{q}$ is the apparent E. M. F. in that path. In general $Z_r$ is considerably lower than $Z_3 + W_s$ and takes practically all of energy delivered by the space discharge path. The greatest amount of energy will be delivered to $Z_T$ when $$Z_T = \frac{R}{q} \quad (3)$$

and since $Z_T$ is generally substantially equal to $Z_r$, this equation gives a rule for proportioning the load impedance. That is, the load impedance $Z_r$ should be approximately in accordance with the following expression:

$$Z_r = \frac{R}{q} \quad (4)$$

The value of $q$ will now be considered, for the case of an ordinary amplifier circuit such as that represented in Fig. 1. It can be seen from (2) that $q$ is dependent on the ratio $\frac{Z_3}{W_s}$. $Z_3$ is generally capacitive reactance. $W_s$ may be of any form. If $W_s$ is purely inductive, the ratio $\frac{Z_3}{W_s}$ will be negative and will vary strongly with frequency. This corresponds to a regenerative condition of the amplifier circuit, $q$ varies with frequency and consequently the repeated current varies in a similar manner. Amplifiers of this type tend to be unstable and stability is obtained generally by adding resistance to the input circuit. In that case, $q$ is complex and varies with frequency, but to a reduced extent. Generally it would be impracticable to make the load impedance meet the condition $Z_r = \frac{R}{q}$, except for a small range of frequencies.

In ordinary amplifiers the value of $q$ is close to unity at low frequencies and increases with frequency. The effect upon the energy transmission is thus of greatest importance at carrier and radio frequencies. The absolute value of $q$ may be about 5 in the case of ordinary commercial amplifier tubes when used in circuits adapted for carrier frequencies in the neighborhood of 50 kilocycles. In that case, the load impedance, as ordinarily determined, will be five times the optimum value, as given by Equation (4).

Figure 3:
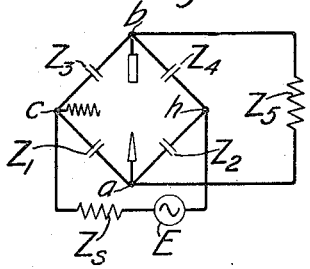
Fig. 3 shows another form of amplifier circuit, in a manner suitable for facilitating explanation of the invention.

Consideration will now be given the type of amplifier system represented schematically in Fig. 3. In this system two serially related impedances $Z_2$ and $Z_4$, external of the space discharge tube, are connected between the anode and the cathode. If desired, an impedance $Z_5$, external to the tube, may also be connected across the anode and cathode, to form part or all of the load impedance. $Z_2$ and $Z_4$ are preferably in the form of condensers having impedances of the same ratio as the impedances $Z_3$ and $Z_1$, so that the source of E. M. F. E and its impedance $Z_s$ are connected between the grid and the junction point $h$ of the impedances $Z_2$ and $Z_4$ at the same potential as the grid. Thus, the output circuit and the input circuit are conjugate branches of a Wheatstone bridge of which the impedances $Z_1$, $Z_2$, $Z_3$ and $Z_4$ form arms.

It can be shown that Equation (1), holds good in this case also, the specific significance of $Z_T$ and $q$, however, being as will now be indicated. Since the space discharge path and the input circuit are conjugate, $Z_T$, the total impedance which R faces, does not include $Z_s$, but includes only the bridge arms and the connected load. In this case $$q = 1 + \mu \left[ \frac{Z_1}{Z_1 + Z_3} \right] = 1 + \mu \left[ \frac{1}{1 + \frac{Z_3}{Z_1}} \right]$$

which involves only the direct capacity impedances between the grid and the plate and filament respectively. The bridge arms between the plate and the grid and between the grid and the filament should preferably be of the same type of impedance. (Generally both are capacities.) When they are of the same type, $\frac{Z_3}{Z_1}$ is a constant positive member and hence $q$ is a constant quantity. The feed-back effect is therefore constant at all frequencies.

As a practical example of an amplifier of this type, assume that $\mu = 6$, $R = 20,000$ and $Z_3 = Z_1$. Then $$q = 1 + 6 \frac{1}{1 + \frac{Z_3}{Z_1}} = 1 + 6 \frac{1}{1 + 1} = 4$$

at all frequencies. The correct value of $Z_T$ in this case is $\frac{20,000}{4} = 5,000$, for maximum transfer of energy from the tube to the impedance $Z_T$. If the arms $Z_2$ and $Z_4$ be given high impedance, $Z_5$ will be substantially equal to $Z_T$ and will take substantially all of the energy output of the tube, so that the condition for maximum energy output will be approximately $Z_5 = \frac{R}{q}$. However, when practicable, the arms $Z_2$ and $Z_4$ are preferably made part of a filter which connects the tube to its load. For example, the impedances $Z_2$ and $Z_4$ may be the impedances of capacities $C_2$ and $C_4$ forming part and a fixed, broad band filter as in Fig. 4 about to be described. Then for the amplifier with the values of $\mu$, R, $Z_3$, $Z_1$ and $q$ just given, the filter should be so designed that its impedance in the pass band will be approximately 5,000 ohms.

Figure 4:
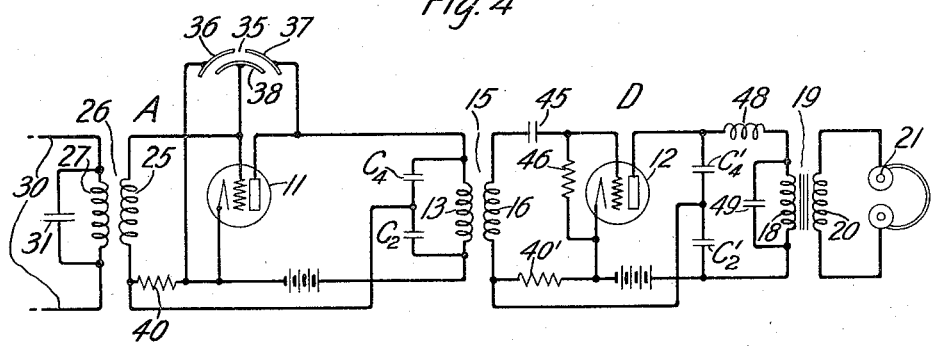
Fig. 4 shows a circuit embodying a form of the invention and including amplifying and detecting circuits of the same general type as the circuit represented in Fig. 3.

Fig. 4 shows an amplifier A comprising a three-element electric space discharge amplifying tube 11, and a detector D comprising a three-element space discharge detector tube 12. The output circuit of tube 11 comprises the primary winding 13 of a transformer 15 which has a secondary winding 16 included in the input circuit of tube 12. The output circuit of tube 12 comprises a primary winding 18 of a transformer 19 which has its secondary winding 20 included in the circuit with a signal indicating device, as for example, the telephone receiver 21. The input circuit of tube 11 comprises the secondary winding 25 of a transformer 26 which has its primary winding 27 included in a circuit 30 which supplies to a transformer 26 signaling waves to be amplified and detected. The circuit 30 is intended to represent any source of side band and unmodulated carrier waves, as for example, waves from a radio receiving antenna, waves from an intermediate frequency amplifying stage, or waves transmitted over a carrier current wire transmission system. Thus, for example, amplifier A may be an amplifier for waves of radio frequency or intermediate frequency, or wire carrier frequency, or may be one stage of a multi-stage amplifier for amplifying such waves. The unmodulated carrier waves may be locally generated, if desired.

The transformer 26 is a band-pass filter type coupling transformer comprising a condenser 31 connected across the primary winding 27 for rendering the transformer selective to the band of frequencies which are to be amplified by amplifier A. The transformer 15 is a band-pass filter type coupling transformer. Both windings are tuned to the same frequency, the secondary by means of the input capacity of detector D, and the primary by serially related capacities $C_2$ and $C_4$. The tuning and the coupling are proportioned to render the transformer selective to the carrier and side band frequencies to be delivered to detector D. A condenser 35 has relatively fixed plates 36 and 37 connected respectively to the filament and the plate of tube 11, and has a plate 38 connected to the grid and movable relatively to plates 36 and 37. The movement of plate 38 simultaneously varies the capacity of condenser 35 between the grid and the filament and between the grid and the plate in such manner that increase of one of these two capacities by a given amount is accompanied by a decrease of the other by a substantially equal amount, and vice versa.

Figure 5:
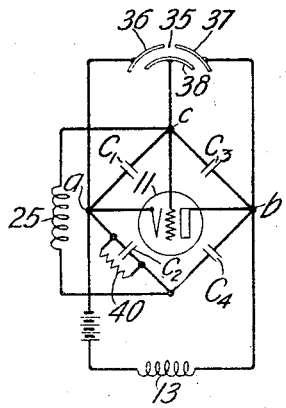
Fig. 5 is a Wheatstone bridge circuit representing an amplifier included in Fig. 4.

The winding 25 is connected between the grid of tube 11 and the junction point of condensers $C_4$ and $C_2$, and the ratio of the impedance of condenser $C_4$ to the impedance of condenser $C_2$ is made equal to the ratio of the combined impedance between the grid and the plate, in the tube and in the condenser 35, to the impedance between the grid and the filament, in the tube and in the condenser 35. Thus, the circuit of the amplifier A may be represented as a Wheatstone bridge circuit, as shown in Fig. 5, the space discharge path and the winding 13 being connected in conjugate relation to the winding 25 by four bridge arms. One of these four arms is the capacity between plates 38 and 37 and the internal grid-plate capacity, in parallel. Another of the four arms is the capacity between plates 38 and 36 and the internal grid-filament capacity $C_1$, in parallel. Another of the four arms is the capacity $C_4$; and another is the capacity $C_2$. A grid leak resistance for the tube is shown at 40. It has practically no effect on the balancing of the bridge; for the capacities $C_2$ and $C_4$, being part of the broad band filter or transformer 15, are very large in comparison with the capacities $C_1$ and $C_3$, and therefore the conductance of a grid leak resistance of, for example, two megohms, is very small in comparison with the admittance of the capacity $C_2$ around which it forms a leak path.

The condenser 35 facilitates balancing the bridge and enables the balance to be obtained without substantially altering the value of the effective input capacity of the amplifier. For example, with a given tube connected in the circuit as shown at 11, $C_1$ may be 5 micro microfarads, $C_3$ may be 3 mmf., and in order to obtain a balance of the bridge the capacity between plates 38 and 36 may be 3 mmf. and the capacity between plates 38 and 37 may be 5 mmf. If then, the given tube be removed from the circuit and another tube of the same type substituted therefore, in which $C_1$ and $C_3$ each have, for example, a value of 4 mmf., plate 38 will be adjusted relative to plates 36 and 37 to a position in which the bridge will be in balanced condition. In this new position of plate 38 the capacity between plates 38 and 36 will be 4 mmf., as will also the capacity between plates 38 and 37. Thus, as in the case of the tube formerly in circuit, the capacity between plates 38 and 36 and the capacity $C_1$ in parallel have a value of 8 mmf., and so also have the capacity between plates 38 and 37 and the capacity $C_3$ in parallel. If desired, the condenser 35, or either of the plates 36 and 37 may be omitted from the circuit.

Since $C_2$ and $C_4$, are very large in comparison with the capacities of the other arms of the bridge, practically the whole E. M. F. produced in the input circuit is impressed upon the input terminals of the tube. That is, the balance is achieved with practically zero loss of amplification.

Moreover, the impedance between the grid and the opposite corner of the bridge, or in other words the impedance faced by winding 25, is substantially equal to the very high impedance which would be presented by a circuit composed of $C_1$, $C_3$, the capacity between plates 38 and 36, and the capacity between plates 38 and 37, if all four of these impedances were connected in parallel.

As a specific example of a practical amplifier, it may be said that if an amplifier employing a type 215–A vacuum tube manufactured by the Western Electric Company, is to amplify a band of frequencies between 55 and 70 kilocycles, the joint capacity of $C_2$ and $C_4$ in series should be about 1000 mmf. in order that the impedance of the filter 15 may match the plate resistance of the tube to the best advantage. For the tube, in its socket, $C_1=3.5$ mmf., and $C_3=4.3$ mmf., approximately. In this case, preferably $C_2$ and $C_4$ should be made equal, the balancing of the bridge being accomplished by condenser 35. $C_2$ and $C_4$ should therefore each have a capacity of 2000 mmf. Their capacity will then be so large that their effect upon the impedance facing winding 25 will be negligible, as will also be the reduction in the grid-filament voltage due to the voltage drop produced in $C_2$ by the waves from winding 25. If $C_2$ and $C_4$ were made very small, say of the same order of magnitude as $C_1$ and $C_3$, the input capacity would be somewhat reduced, but in that case the E. M. F. impressed across the grid and filament of the amplifier would also be materially reduced, whereas with the capacities $C_2$ and $C_4$ large, the loss of input voltage is so small as to be negligible. If the capacities in condenser 35 are sufficiently small, the impedance facing winding 25 in the case of the balanced arrangement will compare advantageously with the value that is obtained for an unneutralized amplifier.

Figure 6:
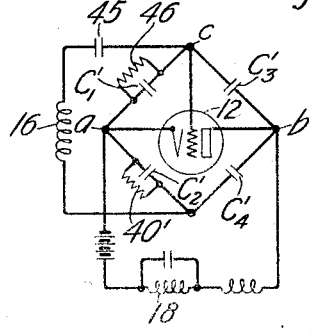
Fig. 6 is a Wheatstone bridge circuit representing a detector included in Fig. 4.

The detector D employs grid current modulation. The impedance looking back into transformer 15 may be high, as for example, approximately equal to the impedance of the internal grid-filament capacity of the detector tube 12, at frequencies of the order of the carrier frequency, in order to produce the desired modulation. A condenser 45 which is connected in series with winding 16, offers high impedance to the low frequency modulation components, to prevent their flow, dissipation in the transformer 15, and thereby increases the efficiency of the detector. A high resistance 46 affords a leak path around the condenser 45, to prevent accumulation of the negative charges on the grid of the detector. An inductance 48 and capacities $C_4'$ and $C_2'$ in the output circuit of tube 12, are adjusted to be of such value as to be anti-resonant at the frequency of the input carrier wave, in order to suppress the high frequency currents in the plate circuit and thereby prevent plate circuit demodulation. This prevention of plate circuit demodulation increases the output energy level at which the detector may be operated. However, when this is done, the tube has a tendency to regenerate, and neutralization of this tendency may be advisable. The neutralization may be effected in the general manner indicated above in connection with the amplifier A, by connecting winding 16 in a path extending between the grid of tube 12 and the junction point of condensers $C_4'$ and $C_2'$ and proportioning condensers $C_4'$ and $C_2'$ to balance the internal grid-filament capacity $C_3'$ and the internal filament capacity $C_1'$ respectively of tube 12, in a Wheatstone bridge. The Wheatstone bridge circuit equivalent to detector D of Fig. 4 is shown in Fig. 6, wherein windings 18 and 16 are connected in conjugate relation to each other by four bridge arms, each arm containing one of the capacities $C_1'$, $C_3'$, $C_2'$ and $C_4'$. In addition to proportioning the capacities in the bridge arms, the resistance 46 and a leak resistance 40', which corresponds to leak resistance 40 of amplifier A, should be so proportioned as to aid the bridge balance. To prevent the leakage inductance of transformer 19 from having any effect in determining the resonance frequency of elements $C_4'$, $C_2'$ and 48, the winding 18 in the transformer may be shunted by a condenser 49 for by-passing the high frequency waves around the transformer. If desired, the condenser 49 and the inductance 48 may be omitted and the leakage inductance of transformer 19 be made to function as the inductance resonating with the capacities $C_4'$ and $C_2'$.

In the operation of the circuit shown in Fig. 4, waves of side-band frequencies, produced by modulating a wave of carrier frequency with signal frequency waves, together with an unmodulated component of the carrier frequency, are transferred by circuit 30 to the transformer 26 which has its secondary winding in the input circuit of the amplifier A. These waves are amplified by amplifier A and the amplified waves are impressed on the input circuit of tube 12. Modulation is effected by the variable input impedance of the tube, which results when the control electrode goes positive and negative during different parts of the cycles of the impressed waves. The potential of the control electrode is normally zero. When the grid is driven positive, the input impedance of the tube drops to a comparatively low value, while, during the time that the grid is driven negative, the input impedance is very high and is almost entirely capacitive, being therefore dependent upon frequency. The greater part of the potential drop in the input circuit takes place across the impedance of the secondary winding 16 of transformer 15 when the control electrode is driven positive, while during the negative part of the cycle the potential may be divided approximately equally across the tube and the impedance of the winding 16. The positive peaks of the input voltage wave are more or less completely suppressed between control electrode and filament, whereas the negative peaks are transmitted without variation, and modulation takes place in the control electrode circuit. The low frequency wave, effective on the control electrode of the tube 12, as a result of the detection, is then amplified in the anode circuit and causes the operation of telephone 21.

In the claims, the term regeneration factor is used to designate the quantity $q$ as defined above:

What is claimed is:

1. An electric space discharge amplifying device having at a given frequency a regeneration factor substantially different from unity, an anode and a cathode in said device, a space discharge path between said anode and said cathode, a control element included in said device for controlling said electric discharge, and an external output circuit for said device facing the discharge path and having an impedance of the order of the impedance of said space discharge path divided by said regeneration factor.

2. An electric space discharge amplifying device having at a given frequency a regeneration factor substantially different from unity, an anode and a cathode in said device, a space discharge path between said anode and said cathode, and a control element included in said device for controlling said electric discharge, the total impedance facing said discharge path at said frequency being approximately equal, in absolute value, to the impedance of said space discharge path divided by said regeneration factor.

3. An amplifier circuit comprising an electric space discharge amplifying device having a plate, a grid, and a cathode element and a Wheatstone bridge having two arms constituted by inter-electrode capacites of said device and two arms constituted by external impedance, an input circuit connected to opposite points of said bridge, and an output circuit connected to other opposite points, the impedance of said output circuit facing the output electrodes having a value of the order of the internal space discharge impedance of the device divided by the regeneration factor to obtain maximum energy output from the device.

4. An amplifying system comprising a space discharge device, anode, cathode and discharge control elements in said device, said device at a given frequency having a regeneration factor different from unity, a voltage applying input circuit connecting a control element and a cathode element of said device an output circuit connecting an anode element and said cathode element, and an input impedance means in said input circuit, said impedance means having all its points of connection to said device at points other than directly to a cathode element, and the impedance of said output circuit having substantially the value of the internal anode to cathode impedance divided by the regeneration factor to obtain maximum energy output from said device.

5. An amplifier circuit comprising an electric space discharge amplifying device and a Wheatstone bridge having two arms constituted by inter-electrode capacites of said device and two arms constituted by external impedances, an input circuit connected to opposite points of said bridge, and an output circuit connected to other opposite points, said output circuit comprising impedance cooperating with said external impedances to form a fixed broad band filter.

6. A wave amplifying system comprising a three element electric space discharge device having internal capacities and a regeneration factor substantially different from unity, input and output circuits for said device, inductance and two capacities included in said output circuit and rendering said circuit selective to waves of desired frequency, and a Wheatstone bridge network of which said internal capacities and said other capacities form arms and said input circuit and a part of said output circuit form branches conjugate to each other, the impedance of said output circuit facing the output electrodes having a value substantially equal to the impedance of the internal space discharge path of the device divided by the regeneration factor to obtain maximum energy output from the device.

7. An amplifying circuit comprising a space discharge tube, an impedance element functioning to impress thereon waves to be amplified, an output circuit comprising a divided impedance element, a grid, an anode and a cathode in said tube, a path extending from said grid through said input impedance element to the intermediate point of said divided impedance element, and a condenser having a plate connected to said anode, a plate connected to said grid, and a plate movable relative to said other plates to simultaneously vary the external capacity between the grid and the cathode and the external capacity between the grid and the anode without substantially altering the impedance facing said first mentioned impedance element.

8. An amplifier circuit comprising an electric space discharge amplifying device having a plate, a grid, and a cathode element, said device at a given frequency having a regeneration factor substantially different from unity, an input circuit and an output circuit connected to said device, means for rendering the feed-back from the output circuit to the input circuit constant at all frequencies and an external impedance facing the output electrodes in said output circuit, having a value of the order of the internal space discharge impedance of the device divided by the regeneration factor to obtain maximum energy output from the device.

In witness whereof, I hereunto subscribe my name this 1st day of September A. D. 1926.

GEORGE H. STEVENSON.